E. A. KIRKENDALL.
RELEASING DEVICE.
APPLICATION FILED MAY 12, 1911.
1,053,043.
Patented Feb. 11, 1913.
2 SHEETS—SHEET 1.
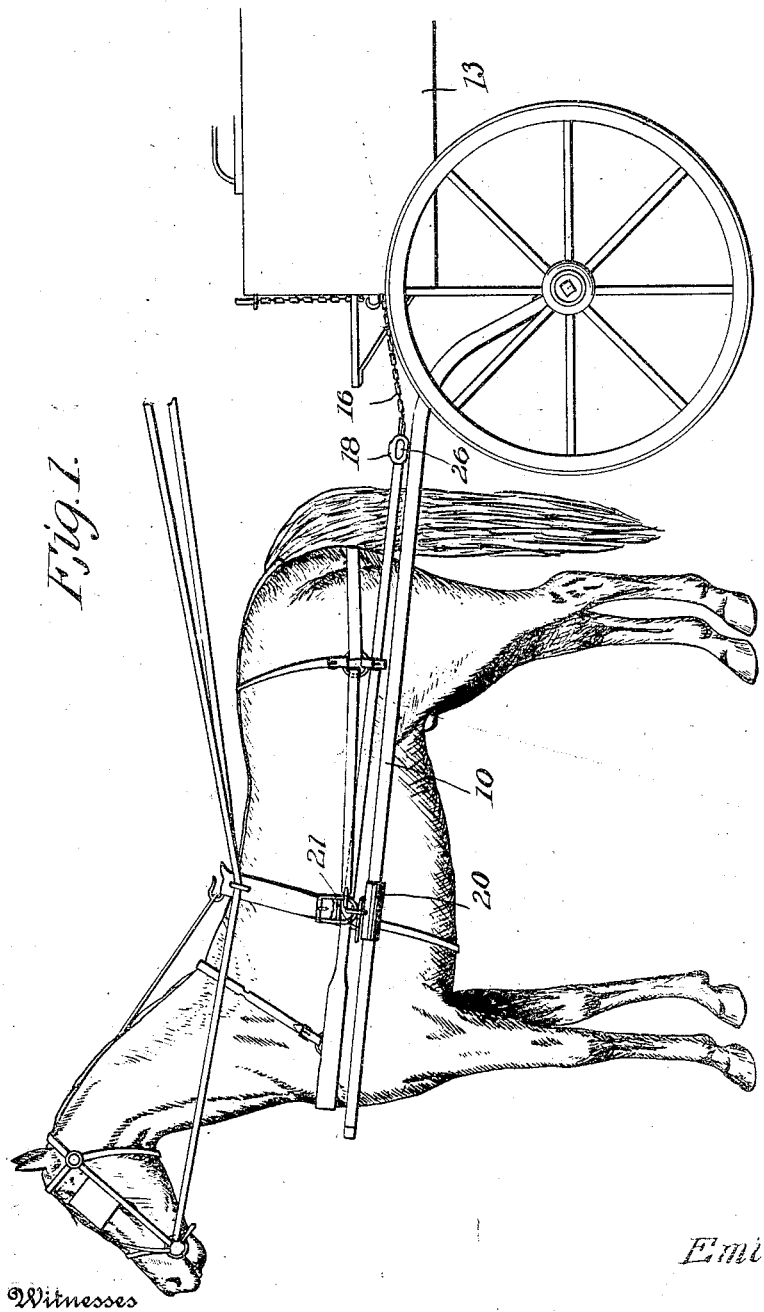
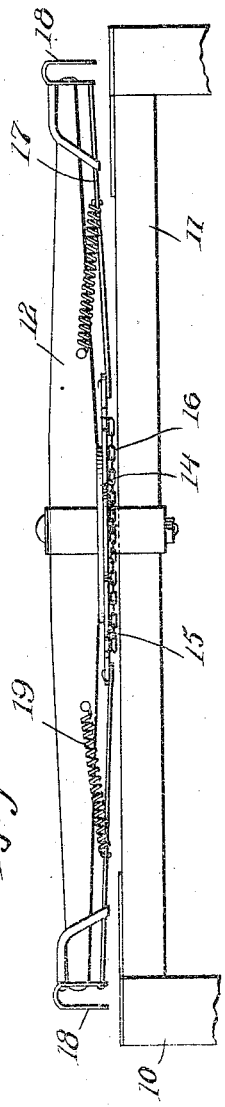
Inventor
Emit A. Kirkendall.
Witnesses
William Smith.
P. A. Hosler
By Victor J. Evans
Attorney

E. A. KIRKENDALL.
RELEASING DEVICE.
APPLICATION FILED MAY 12, 1911.

1,053,043.

Patented Feb. 11, 1913.
2 SHEETS—SHEET 2.

Witnesses
William Smith.
P. G. Hoster.

Inventor
Emit A. Kirkendall.

By Victor J. Evans
Attorney

UNITED STATES PATENT OFFICE.

EMIT A. KIRKENDALL, OF BAKER CITY, OREGON.

RELEASING DEVICE.

1,053,043.  Specification of Letters Patent.  Patented Feb. 11, 1913.

Application filed May 12, 1911. Serial No. 626,677.

*To all whom it may concern:*

Be it known that I, EMIT A. KIRKENDALL, a citizen of the United States, residing at Baker City, in the county of Baker and State of Oregon, have invented new and useful Improvements in Releasing Devices, of which the following is a specification.

An object of the invention is to provide a releasing device, particularly adaptable for vehicles and for quickly releasing a horse from connection with a vehicle.

Among other features, the invention has in view a frame for attachment to the swingletree of a vehicle between the shafts thereof, releasing shoes slidably mounted on the swingletree at the outer ends thereof, means mounted on the said frame and connected with the said shoes for moving the same outwardly from the swingletree to disengage the traces from the swingletree and means extending into the vehicle so that an occupant thereof can operate the shoes to release the traces without leaving his seat in the vehicle.

Reference is to be had to the accompanying drawings constituting a part of this specification, in which similar characters of reference denote corresponding parts in all the views, and in which—

Figure 2:
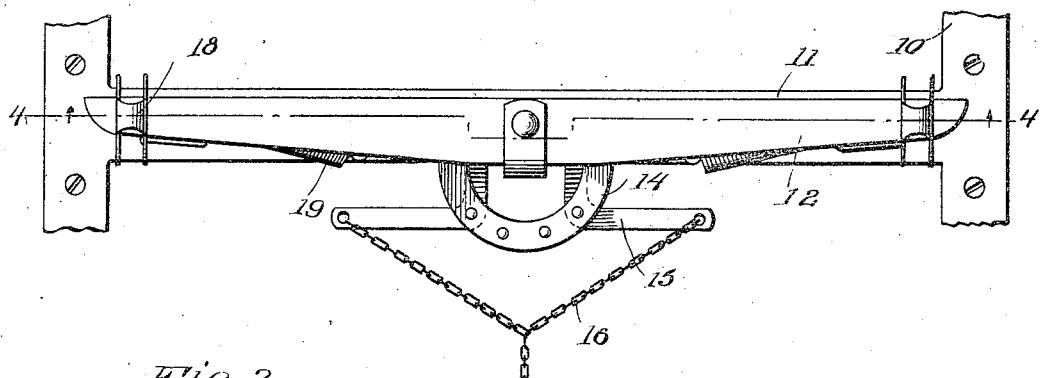
Figure 3:
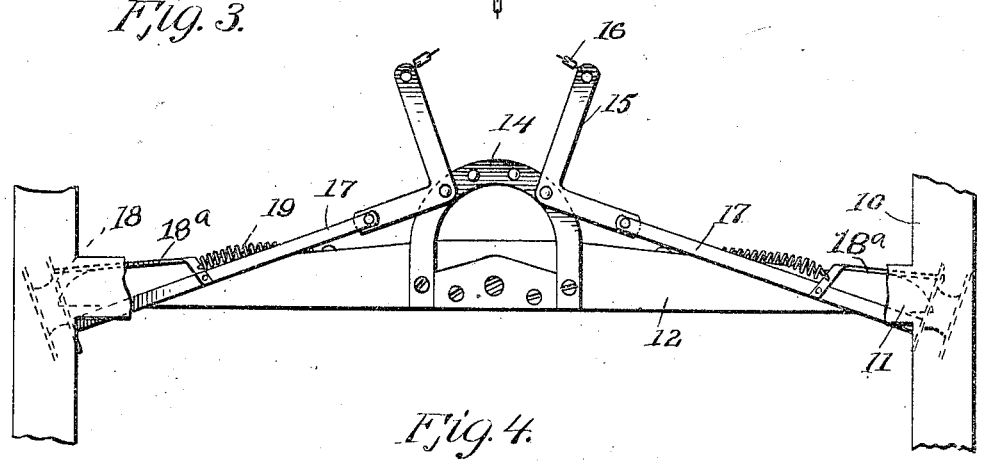
Figure 4:
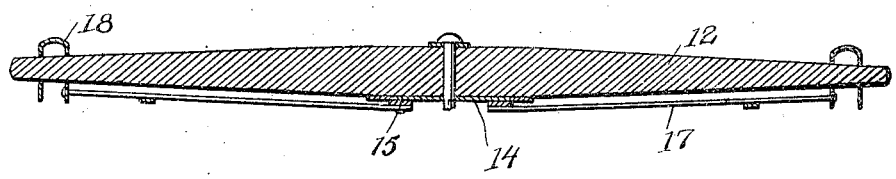
Figure 6:
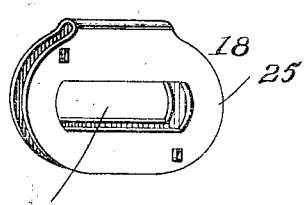

Figure 1 is a side elevation showing my device attached to the swingletree of a vehicle. Fig. 2 is a plan view showing the device in normal position. Fig. 3 is an inverted plan view showing the position of the parts after the traces have been disengaged from the swingletree. Fig. 4 is a transverse sectional view taken on the line 4—4 in Fig. 2. Fig. 5 is a rear elevation disclosing my device in extended position, and Fig. 6 is a perspective view of one of the shoe members.

Although I am aware that various means for releasing horses from vehicles have been devised heretofore, those most generally known of these devices provide means for either entirely releasing the shoes from the vehicle or are provided with pins extended through holes in the traces, thus disclosing a construction which when subjected to a strain and the pulling effect of a horse relative to the vehicle, tend to tear the traces and quickly wear the same out. In my device I aim to provide a construction whereby the traces mounted on the ends of the swingletree, are engaged by shoes slidable on the swingletree, said shoes being adapted to slide the traces outwardly from the ends of the swingletree, thus releasing the harness from connection with the vehicle.

Referring more particularly to the various views I provide suitable shafts 10 connected by a cross bar 11 in the usual manner, and mounted on the cross bar 11 is a swingletree 12, the shafts 10 being connected in any suitable manner to a vehicle 13. Secured to the under side of the swingletree 12 is a frame 14 and pivotally mounted on the frame are a plurality of right angled actuating levers 15, the said levers being provided at their ends with a chain 16 extending rearwardly into the vehicle 13. A U-shaped shoe member 18, having alined openings conforming to the shape of the swingletree ends in its parallel portions, is slidably mounted upon each end of the swingletree, the said end being received by the openings. A flat connecting rod 17 extends outwardly beneath each end portion of the swingletree and at an angle thereto and has its outer end secured to the inner portion or plate of the corresponding shoe, and has its inner end pivotally attached to the inner arm of the adjacent actuating lever 15. A guiding rod $18^a$ extends along the rear face of each end of the swingletree and has its outer end fixed to the said inner portion of the corresponding shoe. The body portion of the rod $18^a$ which bears against the rear face of the swingletree, is inclined inwardly toward the connecting bar 17 and has its inner portion bent under the swingletree end to its point of attachment with the said connecting bar. The guide rods $18^a$ are adapted to guide the shoes 18 into position upon the swingletree ends after having been moved downwardly therefrom. Helical springs 19 have their outer ends attached to the guide rods $18^a$ and their inner ends attached to the corresponding end portions of the swingletree so as to normally maintain the shoes in their engaging position on the said swingletree ends.

At the outer ends of the shafts 10 are provided suitable sleeves 20 and mounted to extend from the sleeves 20 are hooks 21 adapted to receive a portion of the usual harness which is attached to a horse when the same is hitched to a vehicle. The harness of the horse is so connected with the shafts 10 that when the traces engaging the ends of the swingletree 12 are released from the swingletree, that portion of the harness engaging the shafts 10 and the hooks 21 will slide on the said shafts and hooks so that the forward pulling of the horse will enable the same to easily move from between the shafts 10.

In the application of my device, a horse is hitched to the vehicle 13 and, as shown in Fig. 1, my device being at this time in normal position. When it is desired to release the horse from connection with the vehicle 13, the chain attached to the levers 15 is operated to move the said levers, thus moving the shoes 18 outwardly on the swingletree 12 to engage the traces mounted on the swingletree, and the action of the shoes 18 against the traces will disengage the same from the swingletree 12 and the horse will then move outwardly from between the shafts 10. The shoes 18 of my device are preferably constructed of an integral piece of material 25, the said piece of material being in the form of a blank and provided with apertures 26, the said apertures 26 being adapted to register when the blank is bent to form a shoe as shown in Fig. 6.

It will be readily seen that my device can be conveniently adapted for single and double vehicles and although for the purpose of describing my invention I have shown a particular construction, it will be understood that the scope of the invention is fully defined in the appended claim.

Having thus fully described the invention, what I claim as new, is:—

In a device of the class described the combination with a swingletree, of actuating levers pivotally mounted thereon, means for operating said levers to throw their inner arms outwardly simultaneously, a U-shaped shoe member provided in its arms with oblong alined openings for the reception of one end of said swingletree and adapted for slidable movement thereon, an actuating rod connecting the inner arm of each shoe member with the inner arm of one of the said levers, a guide rod having its outer end secured to the inner arm of each of said shoe members adjacent the single cross portion thereof, and extending inwardly against the corresponding end of the swingletree and then being bent at an angle and joined to the actuating rod, said rods adapted to guide the shoe in its movement along the swingletree end, and resilient means for normally maintaining said shoe members in their innermost engaging position.

In testimony whereof I affix my signature in presence of two witnesses.

EMIT A. KIRKENDALL.

Witnesses:
 Gus S. King,
 C. H. McColloch.

Copies of this patent may be obtained for five cents each, by addressing the "Commissioner of Patents, Washington, D. C."